United States Patent [19]

Schaeffer

[11] Patent Number: 4,516,461
[45] Date of Patent: May 14, 1985

[54] KNIFE ASSEMBLY FOR TAPE LAYING MACHINE

[75] Inventor: Andrew P. Schaeffer, Cincinnati, Ohio

[73] Assignee: Cincinnati Milacron Inc., Cincinnati, Ohio

[21] Appl. No.: 586,420

[22] Filed: Mar. 5, 1984

[51] Int. Cl.³ ............................................. B26D 3/08
[52] U.S. Cl. ...................................... 83/881; 83/563; 83/614; 156/522; 156/523
[58] Field of Search ................ 83/879, 881, 563, 614; 156/523, 584, 522

[56] References Cited

U.S. PATENT DOCUMENTS

| | | | |
|---|---|---|---|
| 3,574,040 | 4/1971 | Chitwood et al. | 156/522 |
| 4,292,108 | 9/1981 | Weiss et al. | 156/523 X |
| 4,419,170 | 12/1983 | Blad | 156/523 X |

Primary Examiner—James M. Meister
Attorney, Agent, or Firm—Thomas M. Farrell

[57] ABSTRACT

A knife assembly for composite tape laying machines is disclosed which has a knife movable to a fixed distance from a tape support platen so that the knife, which is transversable across the platen will completely sever a composite tape but not a paper backing tape. A floating presser foot serves to hold the reeled tape snuggly against the platen while cutting is taking place, and the float relative to the knife will accommodate variations in composite tape thickness.

3 Claims, 5 Drawing Figures

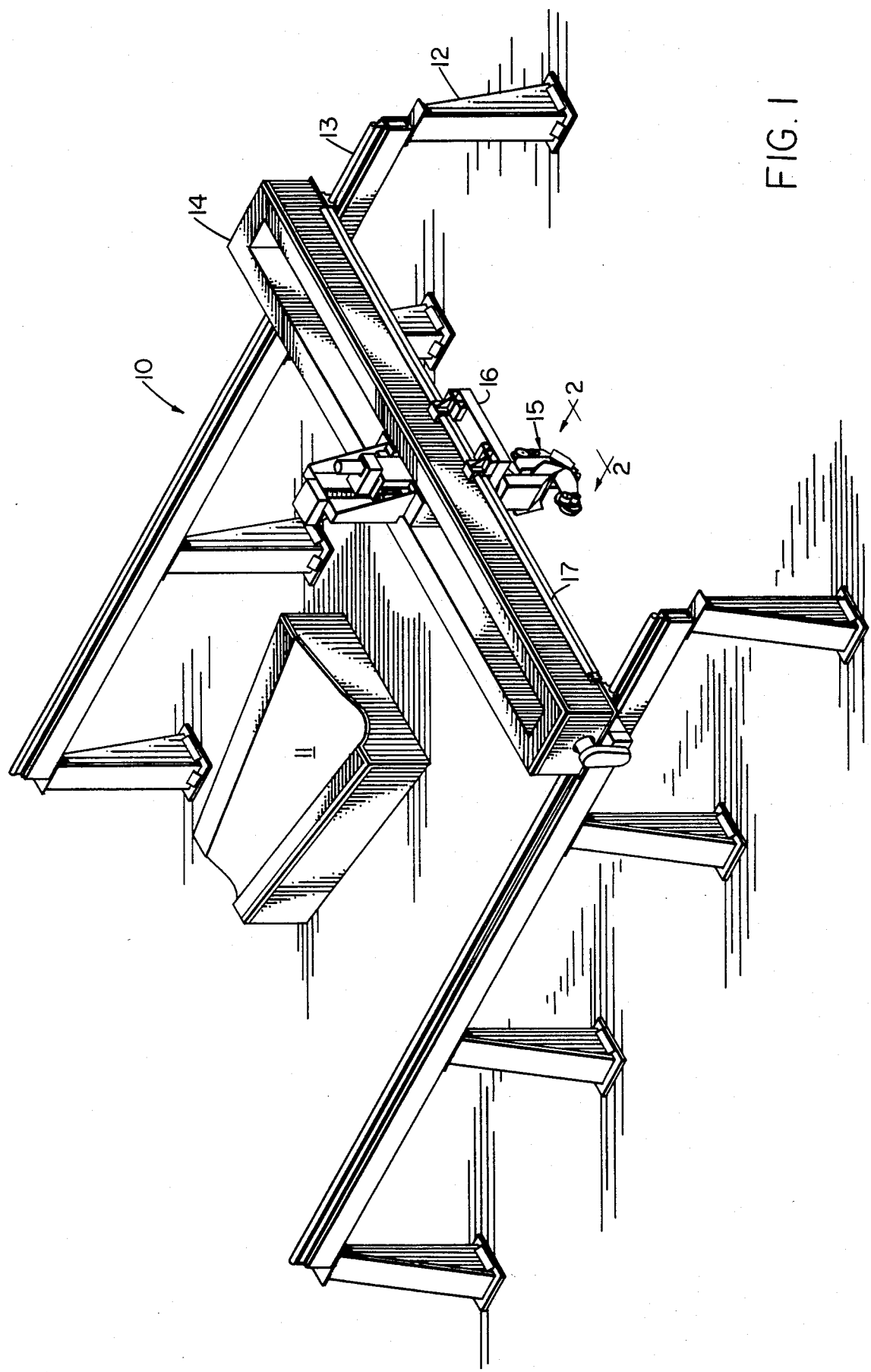

KNIFE ASSEMBLY FOR TAPE LAYING MACHINE

BACKGROUND OF THE INVENTION

In the field of composite structures, in particularly those structures which are made up of layers of tape plys, it is essential to be able to precisely cut the material at predetermined times, to minimize scrap and to insure control of the remaining tape fabric on a roll assembly.

Prior art assemblies have utilized tape composite fabric which is carried on a paper backing, and the paper and tape are slid across a platen which opposes a knife assembly. The knife assembly has a presser foot which rides on the surface of the tape to be cut, and the knife point extends from the presser foot an amount equal to the thickness of the tape. By this type of assembly, it is expected that the tape will be of uniform thickness, and the presser foot and knife assembly will cause the tape to be cut, while leaving the backing paper intact. However, certain difficulties are encountered in actually applying this type of assembly. First, the tape is generally of varying thickness due to manufacturing tolerances, so that the presser foot which rides on the surface of the tape, will cause the knife point to either penetrate entirely through the paper backing, (or at least far enough to weaken the paper backing to the point where it breaks), or a thicker amount of tape will cause the presser foot to ride too high and thus the high knife point will not fully sever the tape.

The paper backing is generally held to a much closer manufacturing tolerance for its thickness, because of the mature development of the paper tape art. In contrast, contemporary composite materials are generally difficult to form to a very precise thickness; and, it is not generally necessary for the composite tape to be held to precise thicknesses, since the final assemblies of tape layers are generally built up and compacted in a press. The materials which make up the tape fabric may typically comprise carbon fibers and the like, impregnated with a prepreg material such as epoxy. This type of tape fabric is somewhat difficult to handle because it is in a tacky state before final curing in a press. For this reason, the material is additionally difficult to maneuver a knife assembly against, since a presser foot must ride smoothly on the tacky surface.

It may be appreciated that other types of tape may be employed, such as reinforced polyetheretherketone (PEEK), which is a thermoplastic material.

Applicant has obviated the difficulties inherent in the prior art knife assemblies for tape laying machines, by a novel design of presser foot and knife which are relatively moved with respect to one another while both are traversing a composite tape.

SUMMARY OF THE INVENTION

The invention is shown embodied in a knife assembly for a tape laying machine, wherein a knife slide is carried with respect to a relatively fixed platen, and a knife blade is supported within the knife slide at a predetermined distance from the fixed platen. A tape presser foot is biased toward the fixed platen, for holding the tape snuggly, and is movable with respect to the knife in assembly. In the preferred embodiment, the knife assembly is mounted in a rotatable spindle which is carried in the knife slide to angularly orient the knife blade with respect to the direction of slide movement. A tape backing surface is provided on the fixed platen, and tape engaging surface is provided on the presser foot, so as to carry and control a tape structure moving between the platen and the presser foot as the knife traverses the tape.

BRIEF DESCRIPTION OF THE DRAWINGS

FIG. 1 is an isometric view of a tape laying machine carrying a tape laying head.

DESCRIPTION OF THE PREFERRED EMBODIMENT

Figure 5:
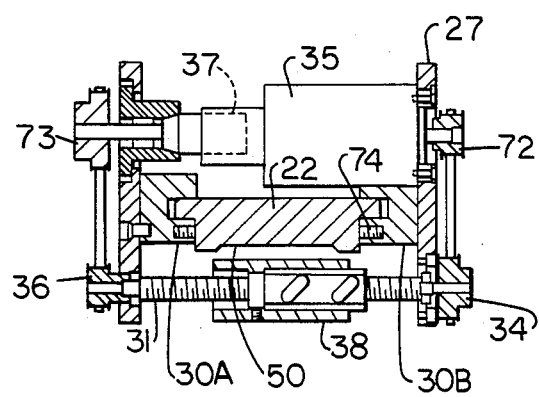
FIG. 5 is a section through the knife slide taken along the line 5—5 of FIG. 2.

FIG. 1 of the drawings depicts a tape laying machine 10 for laying composite tape plys on a mold surface 11 for building up a composite structure. The machine 10 is comprised of a base unit 12 having a way system 13 for supporting a travelling bifurcated gantry 14. The gantry 14 supports a tape laying head 15 which is movable on a saddle 16 carried on saddle support ways 17 on the gantry 14.

Figure 2:
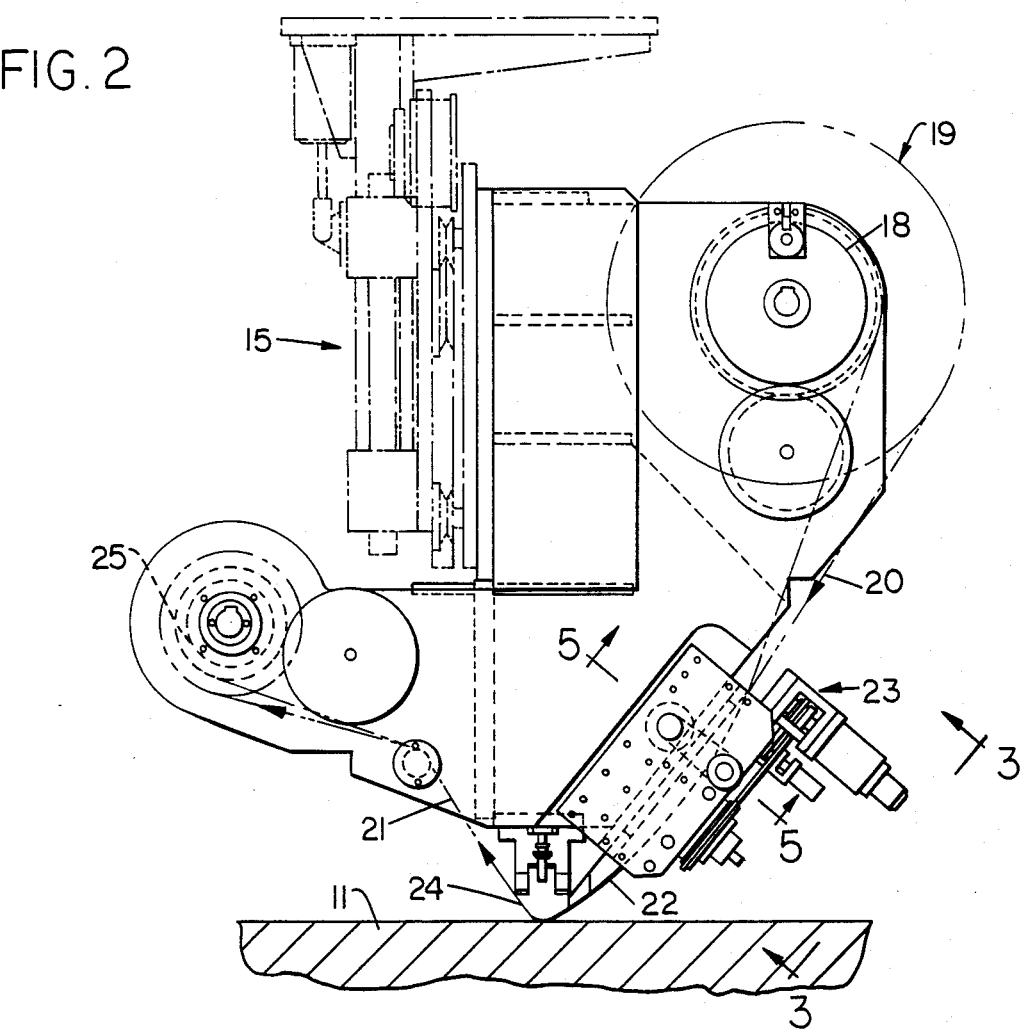
FIG. 2 is an elevational view of the tape laying head of FIG. 1, taken in the direction of arrow 2 of FIG. 1.

The elevational view of FIG. 2 depicts the tape laying head 15 of FIG. 1 having a first reel 18 for carrying a tape roll 19, wherein the composite tape 20 is carried on a paper backing tape 21 (see FIG. 4), and passes along a tape support and guide chute 22 and through a knife assembly 23. The tape passes under a compacting laydown shoe 24, and is trained so that the backing tape 21 will be rolled up on a take-up reel 25 after the composite tape 20 is deposited on a mold surface 11.

Figure 3:
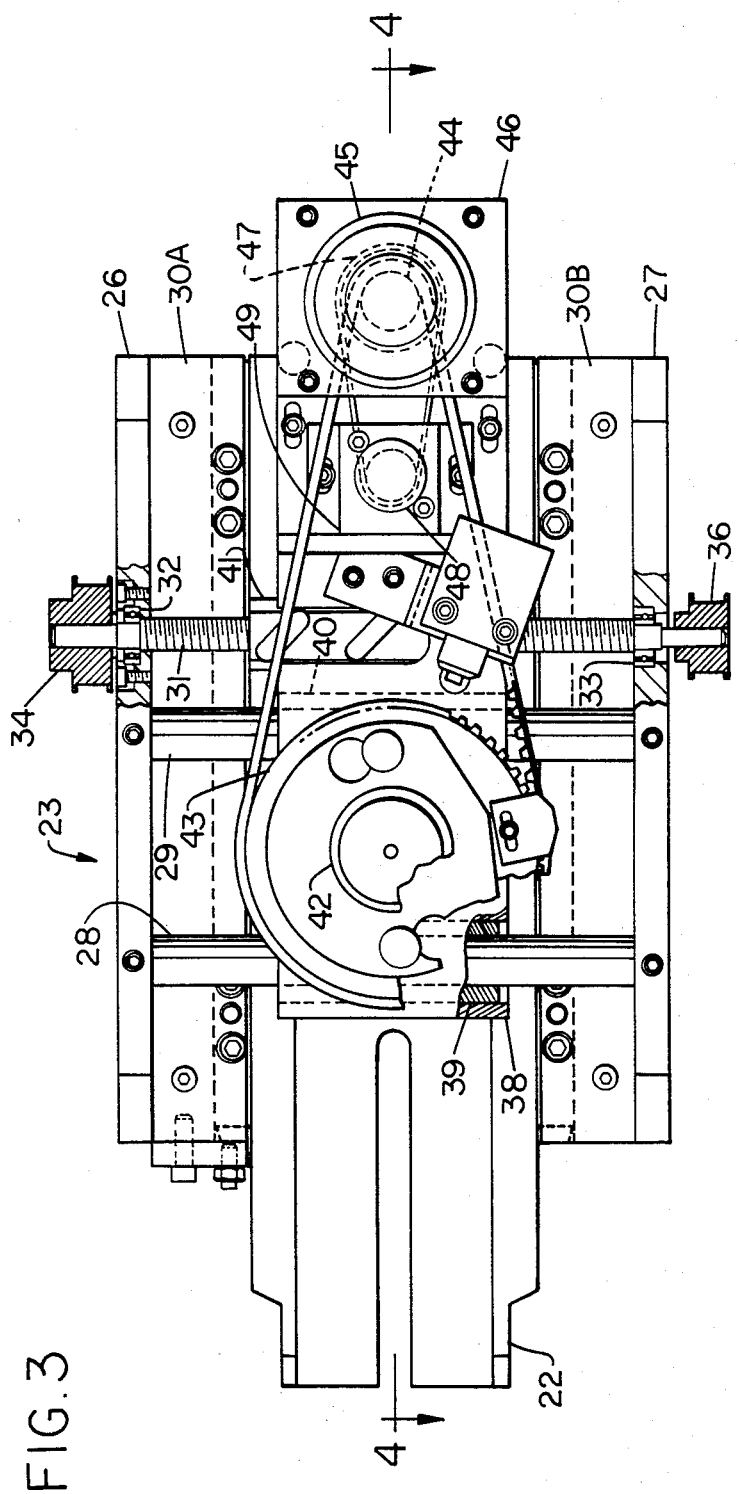
FIG. 3 is a view of the knife assembly of the tape laying head of FIG. 2, taken in the direction of arrow 3 of FIG. 2.

The bottom plan view of FIG. 3 depicts the knife assembly 23 as being comprised, in part, of side plates 26,27 bolted to the tape head frame (not shown) for supporting a pair of parallel slide bars 28,29. A pair of side base plates 30a,b are fixed between the side plates 26,27 and carry the guide chute 22. A ball screw 31 is supported in bearings 32,33 in the side walls 26,27, and is constrained from axial movement therewith. The ball screw 31 has a driven pulley 34 on one end, which is driven by a motor 35 (FIG. 5), and a pulley 36 is supported on the opposite end for driving a resolver 37 (FIG. 5). A knife slide 38 is supported on the slide bars 28,29 and a pair of ball bushing sets 39,40 are carried in the knife slide 38 to provide antifriction support. A ball nut 41 is affixed in the knife slide 38 and is driven together with the slide 38 by rotation of the ball screw 31. The knife slide 38 carries a spindle unit 42 which has a large timing gear 43 attached thereto. The timing gear 43 is driven by the smaller timing gear 44 of a drive motor 45 which is affixed to a mounting block 46 attached to the knife slide 38. The drive motor 45 has a second timing pulley 47 which is drivingly connected to a resolver 48 affixed to an mounting block 49 which, in turn, is adjustably secured to the knife slide 38. The resolver 48 is provided to detect angular spindle orientation. The tape chute 22 is provided on the knife base plate 30, and a shallow slot 50 (FIG. 5) is provided in the chute to guide the composite tape 20 as it passes through the knife assembly 23. The knife (not depicted in FIG. 3) is carried on the centerline of the knife spindle unit 42, and it may be appreciated that the knife blade is to be oriented to the resultant vector formed by the slide velocity and tape velocity when it is desired to cut an angle on the tape, since the tape passes along an axis at 90° to the knife slide axis.

Figure 4:
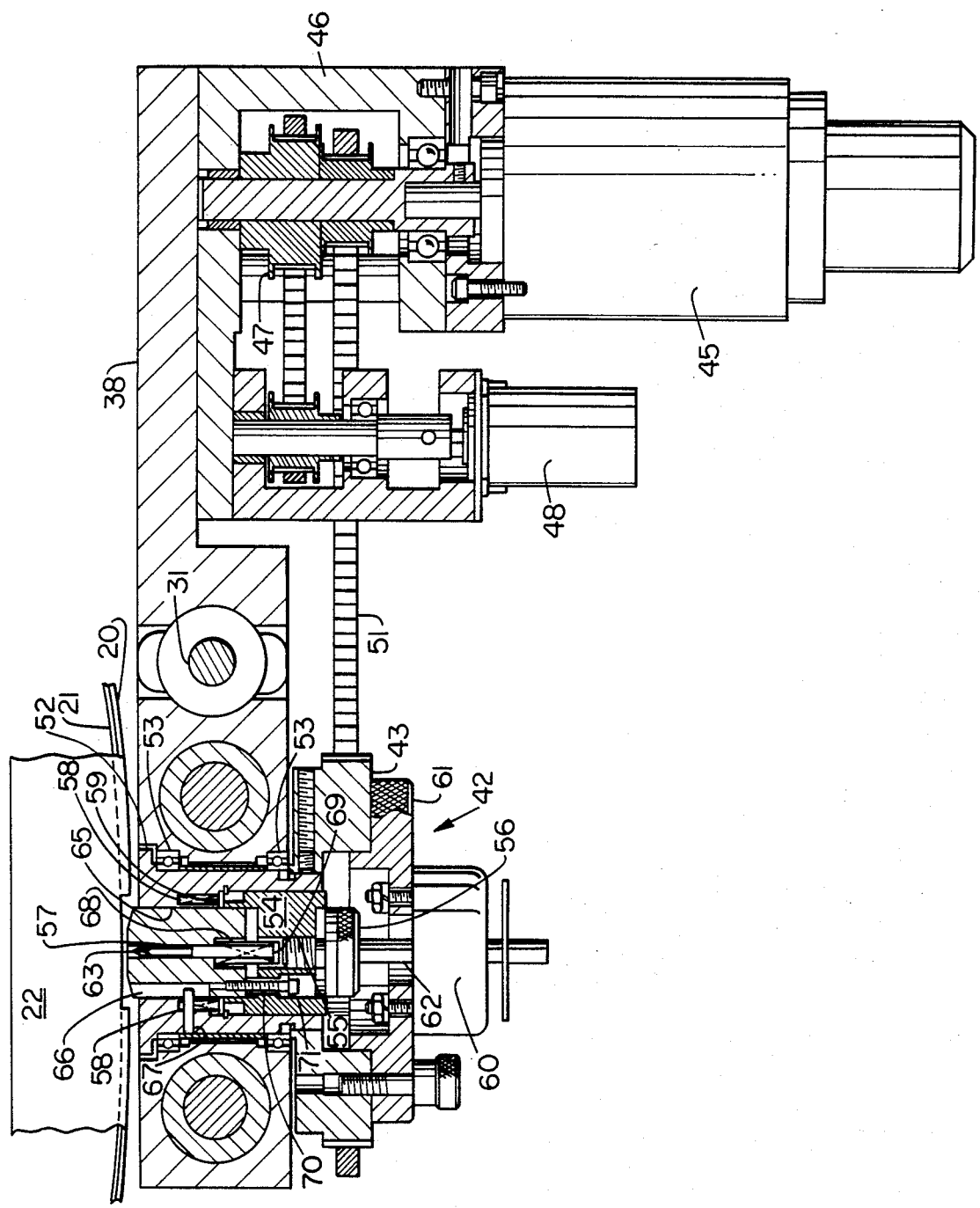
FIG. 4 is a section through the knife assembly of the tape laying head, taken along the line 4—4 of FIG. 3.

FIG. 4 shows a section through the knife slide 38. The knife slide 38 carries the block 46 for supporting the drive motor 45 which is drivingly connected by its pulley 47 to the resolver 48, and a second timing belt 51 connects the drive motor 45 to the pulley 43 of the rotary knife spindle unit 42. The knife spindle 52 is rotatably supported in a pair of bearings 53 fixed in the knife slide 38. The knife spindle 52 carries a central mounting shaft 54 which has a threaded hole 55 in its central portion, for threadably receiving an adjusting screw 56. The adjusting screw 56 serves to adjustably position an elongate knife 57 with respect to the shaft 54 by bearing against the end of the knife 57. The shaft 54 is shown thrusted outwardly by a pair of springs 58 located in holes in the knife spindle 52. The spring 58 are biased against a thrust washer 59 which pushes the shaft 54 outwardly when a solenoid 60 is deactivated. The solenoid 60 is mounted to a mounting cap 61 on the exterior of the spindle pulley 43. When the solenoid 60 is actuated, the solenoid shaft 62 pushes the adjusting screw 56; shaft 54; and knife 57 together as a unit to a fixed extension position of the knife point 63 relative to the knife slide 38. The knife slide 38, of course, is fixedly positioned at a prescribed distance away from the tape chute 22, which serves as a relatively fixed platen for the paper backing tape 21 and the composite tape 20 carried thereon. In this manner, therefore, the knife 57 is extended to a point where it will completely and consistently sever the composite tape 20 yet not cut the paper backing tape 21. The knife 57 is surrounded by a presser foot 64 which is, in the preferred embodiment, solid teflon low-friction material which will not drag on the composite tape 20. The presser foot 64 is a cylindrical block mounted in a bore 65 in the knife spindle 52, concentric to the knife 57. The knife 57 has a substantially cylindrical cross-section with flat blade extensions 57(a) to keep the knife from rotating (see FIG. 4a). A keyway 66 is provided in the presser foot 64, and a pin 67 mounted in the knife spindle 52 serves to prevent the presser foot 64, and thereby the guided knife 57, from rotating relative to the spindle 52. The presser foot 64 is biased inwardly toward the tape 20 (away from the adjusting screw) by a spring 68 reacting against a collar 69 on the knife 57, and a guide rod 70 has a head 71 which is trapped in the shaft to limit the extension of the presser foot 64. However, the presser foot 64 is free to ride outwardly as an obstacle is encountered, such as a thick portion or lump on the tape 20. Thus, it can be seen that the presser foot 64 will be guided off the exterior portion of the composite tape 20 and will float relative to the fixed extension of the knife 57 in its excursion.

FIG. 5 illustrates a section through the knife assembly 23 wherein the side walls 26,27 which carry the slide drive motor 35. The drive motor 35 is shown with its drive pulley 72 on one end drivingly connected with a timing belt to the driven pulley 34 of the ball screw 31. The opposite end of the ball screw 31 has a small timing pulley 36 attached thereto and drivingly connected with a timing belt to the timing pulley 73 of a resolver 37 which is affixed to the side wall 26. The side walls 26,27 support the base plates 30(a)(b) which carry the tape chute 22, and the chute 22 is adjustably positioned by set screws 74 in the base plates 30(a)(b).

It is not intended that the invention be limited to the specific embodiment shown, but rather the invention extends to all such designs and modifications as come within the scope of the appended claims.

What is claimed is:

1. A knife assembly for a tape laying machine utilizing composite tape carried on a backing tape, comprising: a base; a tape platen affixed to said base, having a surface for supporting tape movement in a first direction; a knife slide, movable on said base in a second direction, coordinate to said first direction; means for moving said knife slide in said second direction; a spindle, rotatably supported in said knife slide, having its rotary axis normal to said first and second direction; a knife support, axially movable in said spindle in a direction parallel to said normal rotary axis; an elongate knife member, carried in said knife support; means for rearwardly biasing said knife support away from said platen; means for forwardly biasing said knife support to position said knife member a predetermined distance from said tape platen; a knife edge on said knife member, substantially parallel to a plane formed by said first and second directions; a tape presser member carried by said slide; and yieldable means for biasing said tape presser member toward said platen wherein said knife edge is orientable to the resultant direction of said tape movement and knife slide movement, and wherein said tape presser member will snugly press against the composite tape, holding it to the platen while accommodating variations in tape thickness, and wherein said knife member may completely sever the composite tape without severing the backing tape.

2. The knife assembly of claim 1, wherein said tape presser member is comprised of a low friction plastic material.

3. The knife assembly of claim 1, wherein said tape presser member is comprised of polytetraflouroethylen.

* * * * *